J. KLINE.

Harvester Crank and Pin.

No. 6,490. Reissued June 15, 1875.

Witnesses:

Theophilus Weaver

Peter Stucker

Inventor:

Jacob Kline

THE GRAPHIC CO. PHOTO-LITH. 39 & 41 PARK PLACE, N.Y.

UNITED STATES PATENT OFFICE.

JACOB KLINE, OF CAMP HILL, PA., ASSIGNOR, BY MESNE ASSIGNMENTS, TO HIMSELF, WILSON BEAR, J. A. MOORE, AND M. N. GROVE.

IMPROVEMENT IN HARVESTER CRANKS AND PINS.

Specification forming part of Letters Patent No. 101,134, dated March 22, 1870; reissue No. 6,490, dated June 15, 1875; application filed February 9, 1875.

*To all whom it may concern:*

Be it known that I, JACOB KLINE, of Camp Hill, in the county of Cumberland and State of Pennsylvania, have invented a new and valuable Improvement in Compensation Wrist-Pin, Journal, or Axle; and I do hereby declare that the following is a full, clear, and exact description of the construction and operation of the same, reference being had to the annexed drawings making a part of this specification, and to the letters of reference marked thereon.

Figure 1:
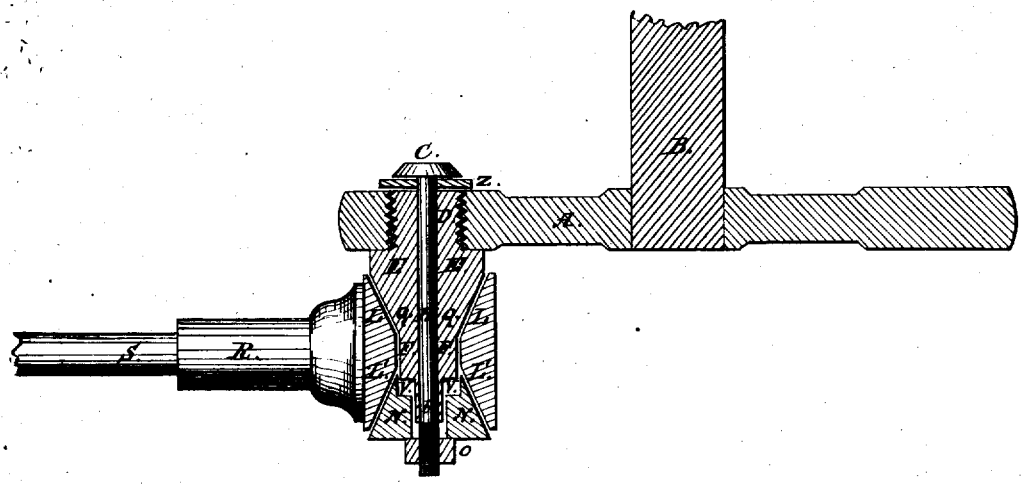
Figure 2:
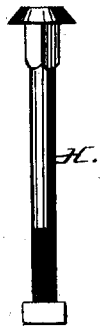
Figure 3:
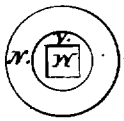
Figure 4:
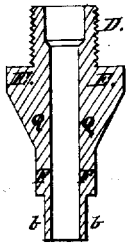
Figure 5:
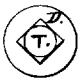
Figure 6:
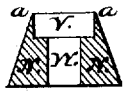
Figure 7:
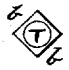

Figure 1 in the drawings is a vertical longitudinal section of my device employed as a wrist-pin. Fig. 2 is a view of the bolt. Fig. 3 is a view of the conical follower. Fig. 4 is a vertical longitudinal section of the wrist-pin, journal, and axle-arm. Fig. 5 is a cross-section of the attaching-shank of the device as a wrist-pin. Fig. 6 is a vertical longitudinal view of the conical follower. Fig. 7 is a cross-section of the tip or muzzle of the wrist-pin, journal, and axle.

The nature of my invention relates to certain peculiar novel structures specially adapted for use as a compensation wrist-pin, journal, or axle; and its main features consist, first, in the employment of a removable screw-bolt, whereby a follower-cone is fed up to or adjustably connected with a butt-cone to compensate for the wear of the journal-surfaces; second, a peculiarly-constructed follower-cone applied by a screw-bolt, and adapted to be correctly and compensatingly set on the forward end of the journal, as a retainer for the hub thereon; third, a peculiarly-constructed journal-body, adapted to securely attach the device, and receive the mountings compensating thereon.

Similar letters denote similar parts in the description.

A is the balance-wheel. B is its shaft. H is a bolt. C is its head. Z is a washer under its head. O is a nut on bolt H. D E Q F *b* is the wrist-pin and journal. D is the attaching-shank thereof. E is its base. Q is a conical enlargement on the arm F. *b* is the tip or muzzle at its front end. N is the conical follower. It is a hollow frustum of a cone, whose apex is cut away by a bore, V, perpendicularly into the frustum about half-way, thus leaving a sharp tapering rim, *a a*, stand about said bore. The bore V admits the arm F tightly into it. The follower is perforated through its remaining height by a square bearing, which admits the tip or muzzle *b* tightly in it, as shown in Fig. 1. L L′ is the hub, made with tapering or converging sockets, as bearings for the conical parts Q N, to which they are adapted. The central bore of the hub is made to snugly admit the cylindrical arm F.

The follower N and hub L L′ are of such relative length compared with the parts Q F *b* that when the conical part Q is entered to its place or bearing at L in the hub the conical follower N will enter the other socket of the hub at L′ deeply enough to allow its sharp tapered rim *a a* to enter as a sleeve on the round arm F, thus insuring its further entrance thereon when it becomes necessary by the wear of the journal-surfaces to set it farther in by adjustment. The recess or bore V in the follower, when it is new, is not wholly filled by the arm F, but a remaining space is left therein, as shown in Fig. 1, to allow the follower or slip-joint to be moved farther in by driving the nut O after wear of parts causes lost motion, which, by this arrangement, is compensated. The follower N is thus supported by two internal bearings, namely, by the rim *a a* on arm F, and by the eye W at its base, on the angular tip *b*. This arrangement insures its steady position at its place of duty to resist canting and rotation, and therefore the nut O need not be jammed, and is, nevertheless, virtually locked. The hub L L′ has a stem, R, thereon, to which the adjustable connecting-rod S is attached by a screw-joint.

In the foregoing description this device has been treated as a wrist-pin mounted on a balance wheel or crank, and its attachment as an ordinary pitman. It is, however, evident it is equally applicable as a balance or other wheel journal or central support. The wheel-hub then coincides with what has been termed hub L L′. It is also evident that the device need be only slightly modified to make an axle for conveyance-wheel. In the latter case the parts E Q F *b* become the arm of the axle, and bolt H is inserted from the other end into it, adjusting the follower N with its head.

In heavy machinery the crank-pin may be formed in this manner, dispensing with nut O, and driving the bolt into a threaded socket or muzzle, *b*.

The advantages of my improvement are, first, the pitman need not be bifurcated, and clamping-bars are dispensed with; second, the connection of the parts need not be taut, thus avoiding friction; third, the device is comparatively noiseless, and the form thereof is in favor of lubrication; fourth, it is a reliable device; the nut is not liable to work loose, and the follower cannot spin or walk in to stick the wheel fast on the journal, or to lock the pitman on the wrist-pin, which would be the case were the follower simply a conical nut on a screw, as is now extant on thill-couplings; fifth, it is a strong device, compact and unobstructive, and requires no great expertness in operatives on machinery to properly adjust it, as, for example, when it is employed on the band-wheels of sewing-machines.

I am aware that conical retainers cannot be claimed broadly, as they are not new; neither do I claim the use of my device as a thill-coupling.

Having thus fully and clearly described my invention, what I regard as new and useful, and what I desire to secure by Letters Patent of the United States as my invention, is—

1. In a compensating wrist-pin, journal, or axle, the device of a removable screw-bolt, whereby a follower-cone, N, may be fed up closer to or upon a butt-cone, Q, to compensate for the wear of the journal and its bearings in hub L L′, without jamming and sticking the parts, substantially as set forth.

2. The wrist-pin, journal, or axle proper, composed of bolt H, butt-cone Q, round arm F, and square tip *b*, in combination with the follower-cone N, recessed roundly at its focal end to admit therein said arm F, and perforated squarely at its butt-end to admit therein said tip *b*, as described.

3. The wrist-pin or journal body, constructed with attaching-shank D, butt-cone Q, arm F, and tip *b*, with reference to attaching it, and mounting thereon the hub L L′ and the follower-cone N by means of a removable screw-bolt, H, substantially as set forth.

In testimony that I claim the foregoing I have hereunto set my hand this 8th day of February, 1875.

JACOB KLINE.

Witnesses:
THEOPHILUS WEAVER,
PETER STUCKER.